United States Patent [19]

Palma

[11] 4,419,031

[45] Dec. 6, 1983

[54] APPARATUS AND METHOD FOR DRILLING DOWEL HOLES

[76] Inventor: James F. Palma, Rte. 2, Box 116A, Lonsdale, Minn. 55046

[21] Appl. No.: 316,410

[22] Filed: Oct. 29, 1981

[51] Int. Cl.$^3$ .......................... B23Q 5/22; B23B 49/00

[52] U.S. Cl. ...................................... 408/1 R; 144/92; 144/365; 269/74; 269/158; 408/108; 408/109; 408/136

[58] Field of Search ............... 144/92, 93 R, 108, 365, 144/353; 269/158, 242, 74; 408/1, 52, 72 R, 103, 108, 109, 136

[56] References Cited

U.S. PATENT DOCUMENTS 3,489,040 1/1970 Westhoff ................................ 408/1

*Primary Examiner*—W. D. Bray

*Attorney, Agent, or Firm*—Kinney, Lange, Braddock, Westman & Fairbairn

[57] ABSTRACT

An apparatus for drilling matching dowel holes in at least two companion workpieces includes a frame with a top surface and a drilling mechanism driven by a motor. The drilling mechanism is slidably attached to the top surface of the frame and movable along a first drilling axis substantially parallel to the top surface. A centering mechanism automatically centers the workpieces with respect to the first axis by movement along a second axis. A positioning mechanism is rigidly attached to the centering mechanism and positions the centering mechanism such that each of the workpieces is positioned in at least two dowel hole drilling positions along the first drilling axis. The positioning mechanism includes spaced-apart first and second stop members which define first and second dowel hole drilling positions. A stop engaging member is positioned movably between the first and second stop members and rigidly connects the positioning mechanism with the centering mechanism. When the stop engaging member is moved to engage the first stop member, the centering mechanism positions the first workpiece in a first dowel hole position for drilling, and when the stop engaging member is moved to engage the second stop member, the centering mechanism positions the same workpiece in a second dowel hole position for drilling. Similarly, a second workpiece is positioned in the first and second dowel hole positions.

12 Claims, 14 Drawing Figures

APPARATUS AND METHOD FOR DRILLING DOWEL HOLES

BACKGROUND OF THE INVENTION

1. Field of the Invention

The present invention relates to an apparatus that drills aligned dowel holes in companion workpieces such that the workpieces when mated are in accurate alignment.

2. Description of the Prior Art

Dowels are used to improve the structural strength of the connection of two companion workpieces. Dowels are typically used in articles of furniture, such as sofa frames, and in cabinetmaking. The positioning of the dowel holes in the mating surfaces of companion workpieces is crucial. If the dowel holes in the companion workpieces are not precisely aligned withe each other, a noticeable misalignment of the workpieces will result. The positioning and drilling of the dowel holes to ensure that the dowel holes drilled in companion workpieces align with each other is a time-consuming task.

Several prior art patents attempt to resolve the problem of accurately positioning dowel holes in companion workpieces.

U.S. Pat. No. 1,556,540 to Patterson, granted in October of 1925, shows a device that secures a piece of wood between horizontally spaced clamping jaws that are slidably mounted on a calibrated fence. A drilling mechanism is positioned to drill the wood held by the clamping jaws at a predetermined point. The device of the Patterson Patent provides for drilling dowel holes in wood stock where many dowel holes are drilled in a run of uniform stock. The device does not provide for quick and precise drilling of dowels in wood stock that is not part of a uniform run.

U.S. Pat. No. 2,928,441 to Farrow, granted in March of 1960, describes a dowel hole boring jig that includes a plate having a slot therein for guiding a drill. The workpiece is placed against a bar that is parallel to the drilling axis for positioning of a first dowel hole. To position a second dowel hole, a spacer is placed between the workpiece and the bar establishing a new dowel hole position. The jig of the Farrow Patent only provides for drilling dowel holes proximate an end of a workpiece.

U.S. Pat. No. 2,943,653 to Crider, granted in July of 1980, shows a structure having two clamping members which are horizontally movable with respect to each other by right and left-hand screws and hold a workpiece therebetween. A drilling mechanism is positioned on the structure such that the mechanism will drill a hole in the workpiece when the workpiece is held by the clamping members. In addition, the workpiece is also held down by a top clamp. A first dowel hole is drilled into the longitudinal end of a workpiece. To drill a matching dowel hole into the side of a companion workpiece, one of the clamping members is pivoted away and the longitudinal end of the second workpiece is placed against the other clamping member. The Crider Patent only provides for drilling alignable dowel holes in companion workpieces proximate their ends.

U.S. Pat. No. 3,708,237 to Kruse, granted in January of 1973, shows a dowel hole drilling jig that clamps the companion workpieces in an aligned side-by-side manner for drilling of the dowel holes. A drilling guide on a carriage is movable along a set of tracks which run above the workpiece surfaces transversely of their longitudinal axes. The drilling guide is positioned along the track over one workpiece and a dowel hole drilled. The guide is then moved along the tracks to the companion workpiece wherein a second dowel hole is drilled. However, the jig of the Kruse Patent is cumbersome to use since the workpieces have to be aligned with each other initially and then re-aligned if a second set of dowel holes is desired.

U.S. Pat. No. 4,174,917 to Brower, granted in November of 1979, describes a doweling device that is adaptable for use in a radial arm saw structure. A drill mechanism is exchanged for the radial arm saw and a movable platform is placed on the workbed of the saw table. The platform is movable by a screw mechanism which is turned by handles to locate the dowel holes to be drilled in a workpiece. A pair of guides for positioning the workpieces are included on the platform. The first dowel hole is drilled in the longitudinal end of a workpiece by holding the workpiece against a guide and moving the platform towards the drill. The second matching dowel hole in a companion workpiece is drilled by placing the companion workpiece transversely against a forwardly disposed surface of the guide. The device of the Brower Patent is awkward in use since the workpieces must be held by the operator while the platform is moved to drill the dowel hole.

SUMMARY OF THE INVENTION

The present invention is an apparatus for drilling matching dowel holes in companion workpieces. The apparatus includes a frame with a top surface and a drilling mechanism for drilling the dowel holes in the workpieces. The drilling mechanism is slidably attached to the top surface and moves along a first drilling axis substantially parallel thereto. A centering mechanism movable along a second axis automatically centers the workpieces with respect to the first drilling axis. A positioning mechanism is rigidly attached to the centering mechanism and positions the centering mechanism in at least two dowel hole drilling positions. The positioning mechanism includes first and second spaced-apart stop members which define first and second dowel hole drilling positions. A stop engaging member is movably positioned and rigidly connects the positioning mechanism with the centering mechanism. When the stop engaging member is moved to engage the first stop member, the centering mechanism is moved to the first dowel hole drilling position and when the stop engaging member is moved to engage the second stop member, the centering mechanism is moved to the second dowel hole drilling position.

In using the present invention, the workpieces are automatically centered with respect to the drilling mechanism by the centering mechanism. The centering mechanism, being rigidly connected to the stop engaging member of the positioning mechanism, is quickly moved to predetermined dowel hole drilling positions. The dowel hole drilling positions are predetermined by pre-setting the positions of the stop members. Consequently, engaging the first stop member positions the centering mechanism and the workpiece in the first dowel hole drilling position and the drill is slidably moved to drill the first dowel hole. Similarly, when the stop engaging member is moved to contact the second stop member, the centering mechanism and the workpiece are positioned in the second dowel hole drilling position at which point the drill is again moved to drill the second dowel hole. To drill matching dowel holes in a companion workpiece, the first workpiece is retained within the centering mechanism. The companion workpiece is accurately aligned with one surface of the first workpiece between the first workpiece and the drill. The stop engaging member when moved to engage both the first and second stop members, positions the companion workpiece in the first and second dowel hole drilling positions. Consequently, the dowel holes are drilled in the companion workpiece at precisely matching positions with the dowel holes of the first workpiece.

DETAILED DESCRIPTION OF THE PREFERRED EMBODIMENT

Figure 1:
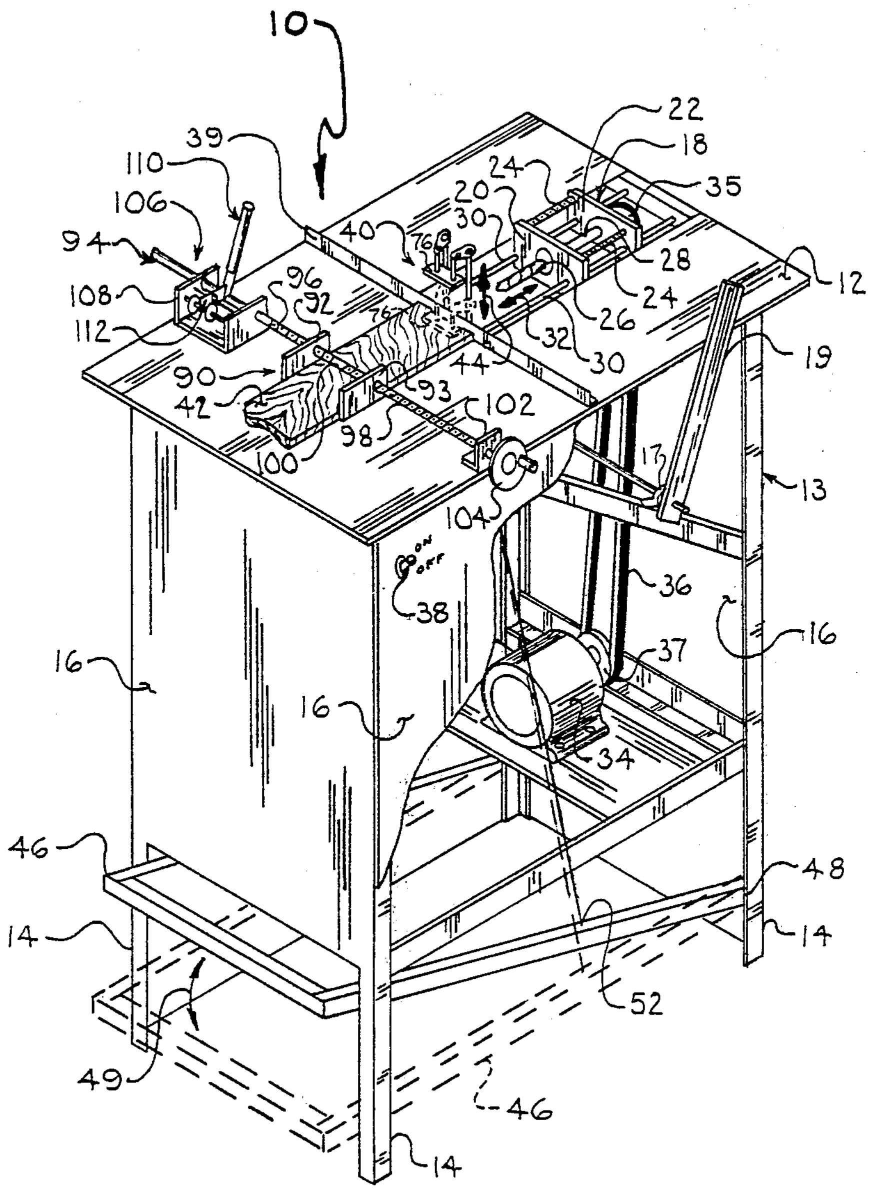
FIG. 1 is a perspective view of the apparatus for drilling dowel holes.

The apparatus of the present invention for drilling dowel holes is generally indicated at 10 in FIG. 1. Throughout the figures, like reference characters are used to indicate like elements. The apparatus 10 includes a table top 12 with a top surface and positioned on a support structure 13 having a plurality of legs 14 with side panels 16. The structure 13 is fastened together by suitable means such as nuts and bolts.

Figure 2:
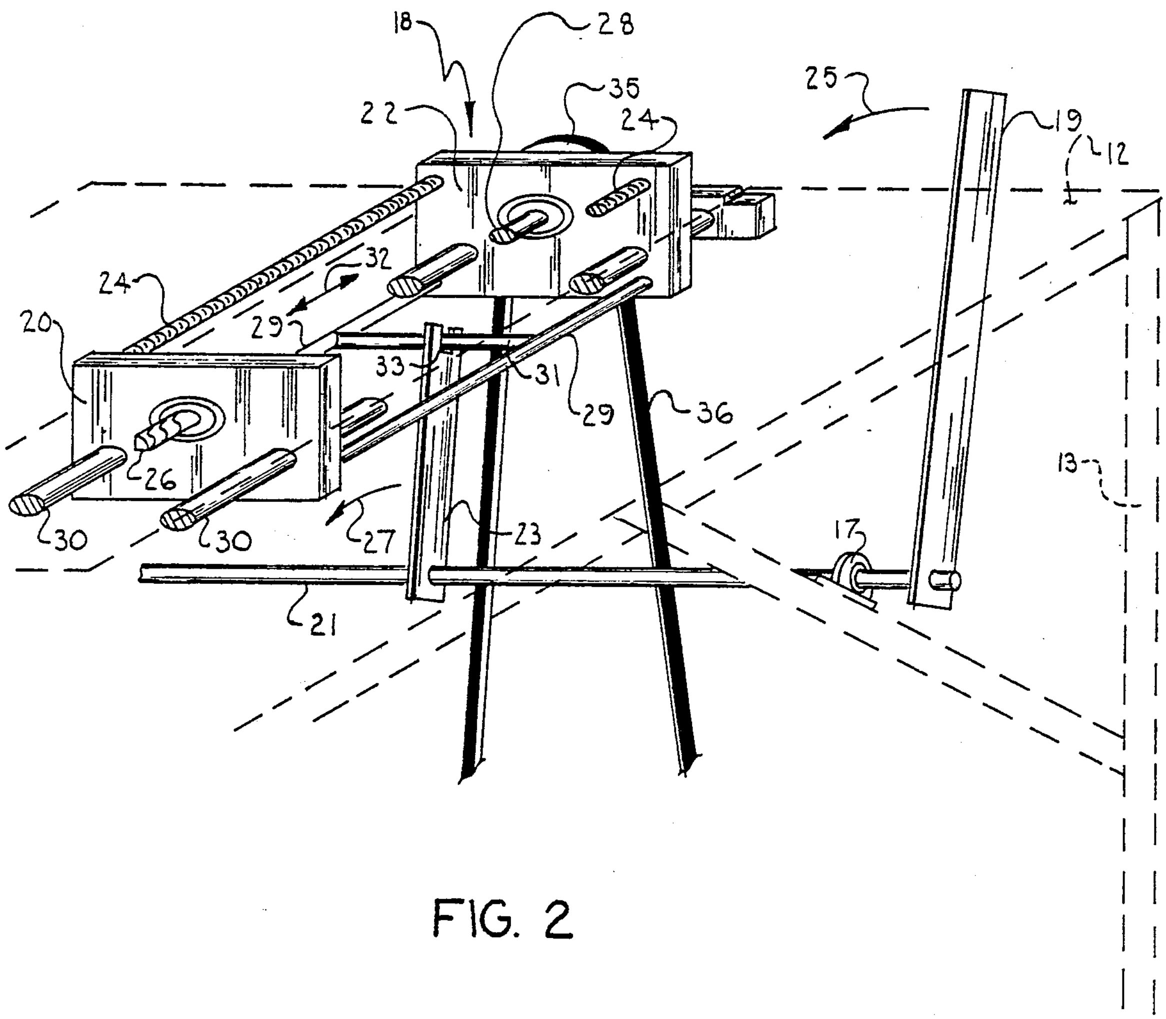
FIG. 2 is an enlarged perspective view of the drilling mechanism of the apparatus of FIG. 1 with portions broken away for purposes of clarity.

A drilling mechanism 18 has front and back spaced-apart carriage plates 20, 22, fastened to each other by threaded spacer rods 24, 24, in any suitable manner such as illustrated in FIGS. 1 and 2. A drill bit 26 defining a drilling axis is properly centered and rotatably attached to the front carriage plate 20. A drill bit connecting shaft 28 provides a rotational connection between the drill bit 26 and the far side of the back plate 22. Slide rails 30, 30 are integrally and fixedly mounted with respect to table top 12 in an opening provided therethrough. As shown, the drilling mechanism 18 is movable back and forth along the top surface of table top 12 along these slide rails 30 in a direction parallel to the drilling axis as indicated by arrows 32.

The drill bit 26 of the drilling mechanism 18 is preferably driven by a motor 34 which may be secured to the structure 13 by any suitable means. The motor 34 drives the connecting shaft 28 and bit 26 of mechanism 18 through a drive belt 36 that frictionally engages cooperating pulleys 35 on shaft 28 and 37 on the motor shaft. The motor 34 is preferably an electrical motor that is turned on and off by a switch 38.

A preferred manner of moving the drilling mechanism 18 to drill dowel holes is illustrated in FIG. 2. A crank handle 19 is fixedly attached to a crank rod 21. The crank rod 21 is rotatably mounted to the support structure 13 in any suitable manner, such as by bearings 17. A lower end portion of a lever arm 23 is welded to the crank rod 21 so that when the handle 19 is moved in the direction of arrow 25, the lever arm 23 will move in the direction of arrow 27. The drilling mechanism 18 further includes a lower framework having a pair of horizontal bars 29, 29 extending in parallel relation to slide rails 30 and a transverse connecting bar 31 integrally connecting the bars 29 to each other. The bars 29 connect the spaced-apart carriage plates 20, 22 of the drilling mechanism to each other. The transverse connecting bar 31 extends through a slot 33 provided in the lever arm 23 such that the rotation of crank rod 21 by the handle 19 is transmitted by lever arm 23 to the transverse connecting bar 31 therby sliding the drilling mechanism along rails 30, 30 in the direction of arrows 32.

Figure 4:
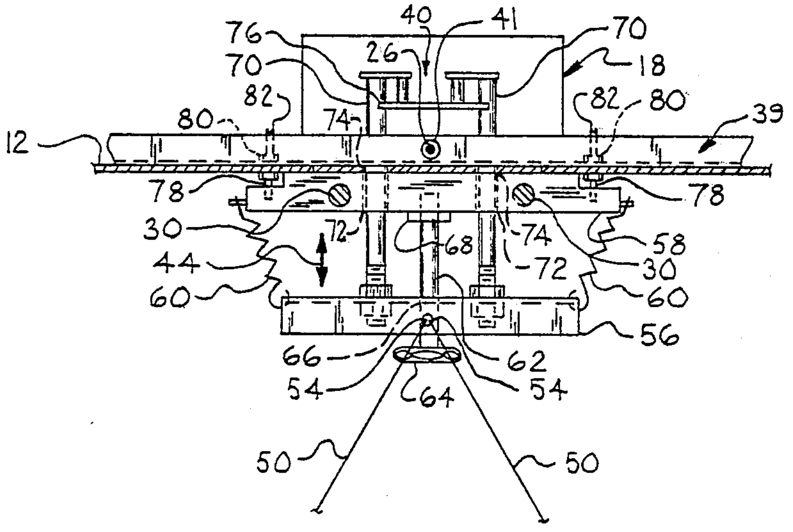
FIG. 4 is a cross sectional view of the clamping mechanism taken approximately on line 4—4 in FIG. 3.

An elongated, flat, substantially vertical positioning bar 39, preferably one leg of an angle iron, is permanently attached to the top surface of the table top 12 to lie in a plane substantially perpendicular to the axis of drill bit 26, the drilling axis. The bar 39 has an aperture 41 coaxial with the drilling axis and the drill bit 26, as illustrated in FIG. 4. A first workpiece 42 is positioned with an end to be drilled abutting the positioning bar 39. The depth of dowel holes drilled in the end is fixed by the distance the drill bit 26 moves through the aperture 41. The distance, however, may be adjusted by suitable means such as stops within the drilling mechanism which adjust the slidable distance of the drilling mechanism.

Figure 3:
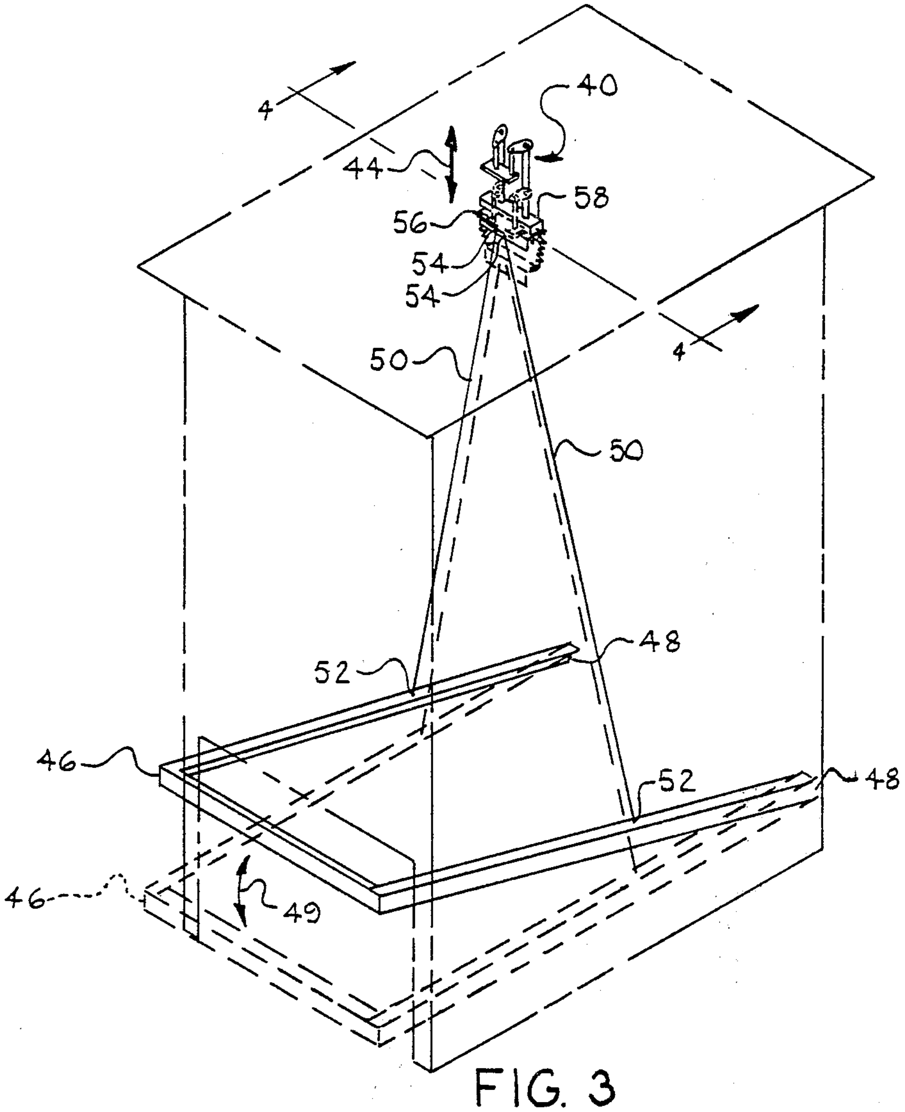
FIG. 3 is a perspective diagramical view of a top clamping mechanism of the apparatus illustrating its operation.

Preferably, a top clamp assembly 40 secures the first workpiece 42 on the top surface of the table top 12 and thereby retains the workpiece 42 against the top surface while dowel holes are drilled therein. The workpiece 42, when abutted against positioning bar 39, is aligned such that a dowel hole can be drilled perpendicularly to the abutting surface of the workpiece. Referring to FIGS. 1, 3, and 4, the clamp assembly 40 moves up and down in a generally vertical clamping direction, as indicated by arrows 44. The clamp 40 is preferably actuated by a foot pedal assembly 46 pivoting about a pivot point 48 as illustrated in FIGS. 1 and 3 from the position seen in full lines to the position seen in broken lines, and as indicated by arrows 49. A pair of clamping linkages 50, 50 are attached at their bottom ends 52 to the foot pedal assembly 46 and at their top ends 54 to the top clamp assembly 40, as illustrated in FIG. 3.

As seen in FIG. 4, the linkages 50, 50 are fixedly attached at their top ends 54 to a horizontal bottom bar 56 of the top clamp assembly 40. The top clamp assembly 40 further includes a top horizontal bar 58 which is fixedly secured to an underside of table top 12 and which includes appropriate apertures for supporting slide rails 30, 30. The bottom bar 56 is positioned generally parallel to and below the top bar 58 and is biased, as shown, by a pair of coil springs 60, 60 toward the top bar 58 against the pulling force of the clamping linkages 50, 50.

A stop-bolt 62 limits the downward travel of the bottom bar 56 when the foot pedal assembly 46 is engaged to actuate the clamp assembly 40 toward its clamping position. The stop-bolt 62 is threadably mounted in top bar 58 and extends through an aperture 66 in the bottom bar 56. The stop-bolt 62 has a head 64 which is positioned from the top bar 58 a predetermined distance. A lock nut 68 threadably engages the stop-bolt 62 and retains and locks the stop-bolt 62 at its predetermined length preventing it from moving during the course of operation of the clamp assembly 40. When the bottom bar 56 is pulled in the direction of the downward arrow 44 by the linkages 50, 50, the bolt head 64 acts as a stop and defines the lowest vertical position to which the bar 56 can travel.

A pair of clamping rods 70, 70 are fixedly attached at their lower ends to the bottom bar 56 and extend through provided apertures 72 in the top bar 58 and apertures 74 in the table top 12. A clamping plate 76 is fixedly attached to the upper ends of the clamping rods 70. The clamping plate 76 clamps the workpiece 42 against the table top 12, as seen in dotted lines in FIG. 1, when the linkages 50, 50 pull the bottom bar 56 downwardly.

The clamping plate 76 is limited in its downward movement to its position when bottom bar 56 contacts bolt head 64. This prevents accidential contact between the drill bit 26 and the clamping plate 76 when a workpiece is not in position below the clamping plate.

The top clamp assembly 40 is secured to the table top 12 preferably by a pair of bolts 78, 78 which extend through apertures in the table top 12, as illustrated in FIG. 4. The bolts 78 are secured to the table top 12 at their upper ends with nuts 80 and threadably engage the top bar 58 with their lower ends holding the bar 58 and consequently the clamp assembly 40 in a fixed position with respect to the table top 12. The bolts 78 have slotted upper ends 82 which facilitate the turning of the bolts with an appropriate tool such as a screwdriver.

Before clamp assembly 40 is applied, the workpiece 42 is centered with respect to the drilling mechanism 18 by a preferred clamp-type centering mechanism 90. The centering mechanism 90 has left and right clamping plates 92 and 93, respectively, with a rigid, threaded, clamping plate centering rod 94 threadably associated with these clamping plates. The rod 94 has left-hand and right-hand threaded portions 96 and 98, respectively, with the left-hand threads operably engaged through clamping plate 92 and the right-hand threaded portions operably engaged through clamping plate 93. The left-hand and right-hand threaded portions 96, 98 converge at a point 100 which represents the center point of the centering mechanism 90. The point 100 will lie in a vertical plane containing the drilling axis, with the clamping plates 92, 93 being at all times equally spaced from the point 100.

A centering rod support bracket 102 is fixedly attached to the table top 12 and rotatably supports an unthreaded first end portion of the rod 94. A centering rod crank handle 104 is fixedly attached to the rod 94 at the same end for facilitating the rotation of the centering rod 94. A positioning mechanism 106 (described in further detail subsequently) rotatably supports the rod 94 at its second end. The clamping plates 92, 93 are moved in substantially equal, opposite directions along the rod 94 from the point 100 to clamp and center the workpiece 42 along the drilling axis by rotating the crank handle 104.

Figure 5:
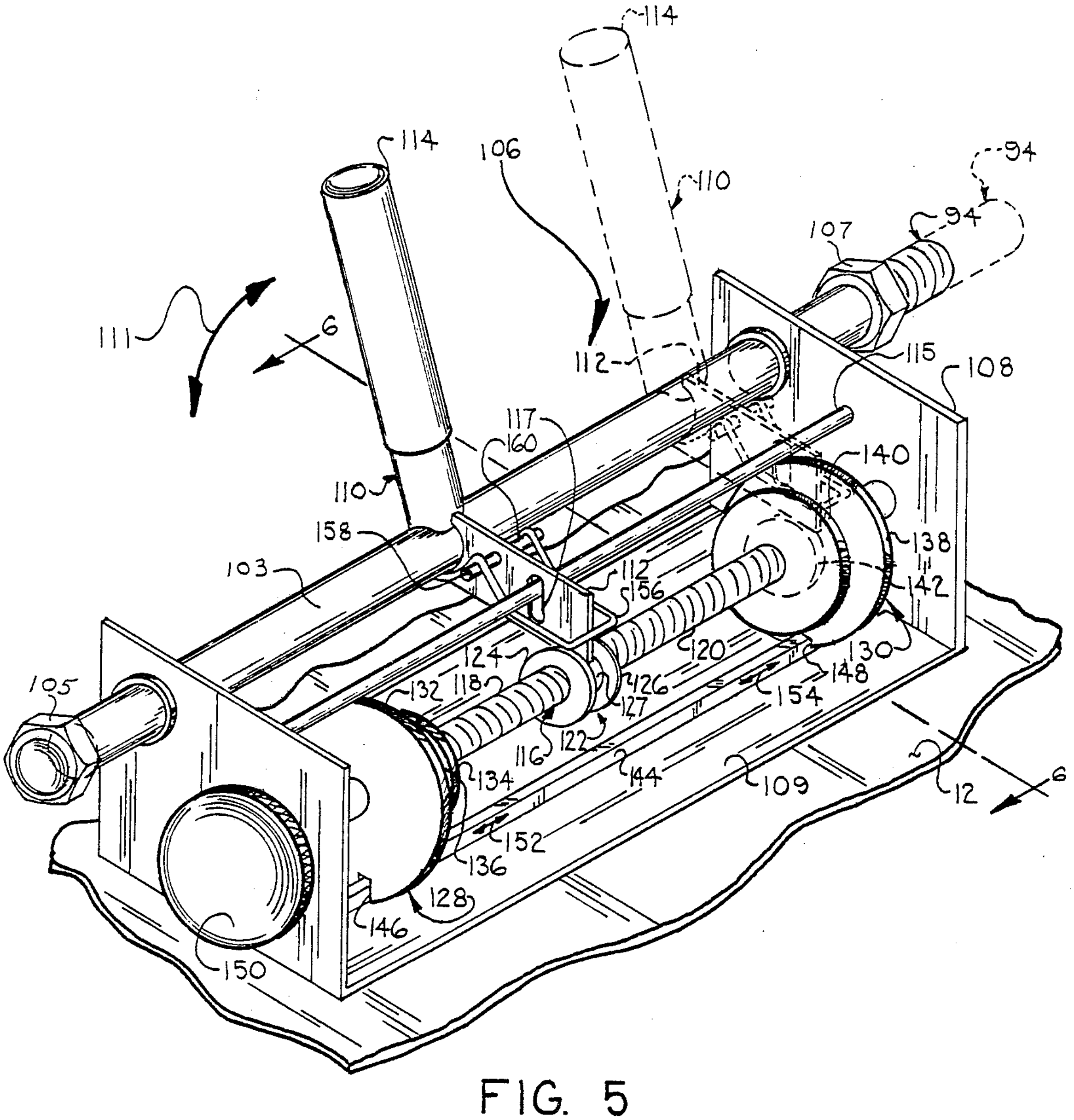
FIG. 5 is an enlarged perspective view of the positioning mechanism of the present invention as seen from the upper left-hand corner of FIG. 1.

The positioning mechanism 106 includes a U-shape support bracket 108 having a horizontal bottom section 109 fixedly secured to the table top 12 by any suitable means. A stop engaging member 110 is attached to the rod 94 in a suitable manner such that the stop engaging member 110 is fixed along the longitudinal axis of the rod 94 but freely pivots about rod 94, in directions as indicated by arrows 111, as best seen in FIG. 5. Preferably, a sleeve 103 surrounds the rod 94 and retaining nuts 105 and 107 engage threads of the rod 94 proximate both ends of the sleeve 103 retaining the sleeve 103 in a fixed position along the longitudinal axis of the rod 94. The stop member 110 is welded to the outside surface and pivots along with the sleeve 103 in an angular direction.

The stop engaging member 110 preferably has a handle 114 and a blade portion 112 rigidly secured with respect to the handle 114. A guide rod 115 is rigidly attached at both ends to the upright portions of the U-shape support bracket 108 and extends through a slot 117 provided in blade portion 112.

A stop-support rod 116 is rotatably mounted in the upright portion of the U-shape support bracket 108 at both ends. The stop-support rod 116 has left-hand threaded portions 118 and right-hand threaded portions 120 converging at a spool-like ring 122. The ring 122 has left and right collars 124, 126 and a centering recess 127. Left and right stop members 128, 130 threadedly engage left-hand and right-hand threads 118, 120, respectively. The left and right stop members 128, 130 are spaced approximately equal distances from the center of the ring 122. The left stop member 128 has a back flange 132 and a front flange 134 having a tapered edge facing the ring 122 and a recessed portion 136. Similarly, the right stop member 130 has a back flange 138 and a front flange 140 having a tapered edge facing the ring 122 and a recessed portion 142.

A slide bar or key 144 is fixedly attached to the bottom section 109 of the bracket 108 on an upper surface thereof, lower portions of the back flanges 132, 138 of stop members 128 and 130 are provided with slots 146, 148, respectively, which encompasses key 144 to prevent the stop members from rotating about stop-support rod 116 while permitting them longitudinal movement along the rod 116.

The ring 122 is positioned such that when the blade portion 112 rests within the recess 127, the point 100 on the rod 94 is positioned in a vertical plane including the drilling axis. With the point 100 so positioned, the centering mechanism can automatically center the workpiece 42 with the left and right clamping plates 92, 93 positioned equal distances from the drilling axis.

The left stop member 128 and the right stop member 130 define the dowel hole positions in the first workpiece 42. When the blade portion 112 of positioning mechanism 106 is moved to the right as seen in FIGS. 1 and 5, and positioned to rest in the recessed portion 142 of the right stop member 130, the shaft 94 will also be moved to the right. Moving the shaft 94 to the right, simultaneously moves the centering mechanism 90 along with the workpiece 42 to the right, positioning the workpiece 42 for drilling the first dowel hole. This position of positioning mechanism 106 is shown by broken lines in FIG. 5. Similarly, when the stop engaging member 110 is moved to the left and the blade portion 112 is positioned in the recessed portion 136 of the left stop member 128, the rod 94 will also be moved to the left, simultaneously moving the centering mechanism 90 to the left and positioning the workpiece 42 in the second dowel hole drilling position. The guide rod 115 extending through the slot 117 sufficiently limits the pivotal movement of the stop engaging member 110 such that its blade portion 112 will always be in position to engage back flanges 132 and 138 even while being in clearing relation to the collars 124, 126 of ring 122 and front flanges 134 and 140 to stop members 128 and 130. In this manner, two dowel holes may be quickly drilled in the workpiece with little effort in a simple and efficient manner, each dowel hole being an equal distance from the center line of the workpiece.

The position of the left and right stop members 128, 130 from the ring 122 is adjustable. A knob 150 is rigidly attached to one end of the stop-support rod 116. Turning the knob 150 turns the rod 116 and moves both stop members 128, 130 in the directions indicated by arrows 152, 154. The stop members 128, 130, being rotatably and threadably mounted on left-hand and right-hand threads, respectively, move in opposite directions with respect to the ring 122. For narrower workpieces, the dowel holes may be positioned closer together by simply moving the stop members 128, 130 toward the ring 122. Similarly, for wider workpieces, the dowel holes can be drilled further apart by turning the knob 150 in an appropriate direction to move the stop members 128, 130 further apart.

Figure 6:
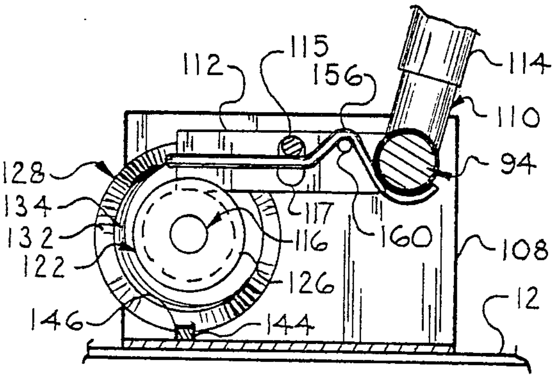
FIG. 6 is a cross-sectional view of the positioning mechanism taken along the lines 6—6 in FIG. 5.

A spring 156 preferably biases the blade portion 112 in a downwardly direction holding the blade portion 112 firmly in the recess 127 of the ring 122, the recessed portion 136 of the left stop member 128, or the recessed portion 142 of the right stop member 130. The spring 156 preferably is wrapped around both vertical sides of the blade portion 112 and engages pins 158 and 160 extending outwardly from these vertical sides, partially wrapping the shaft 94 underneath, as illustrated in FIGS. 5 and 6.

Figure 7:
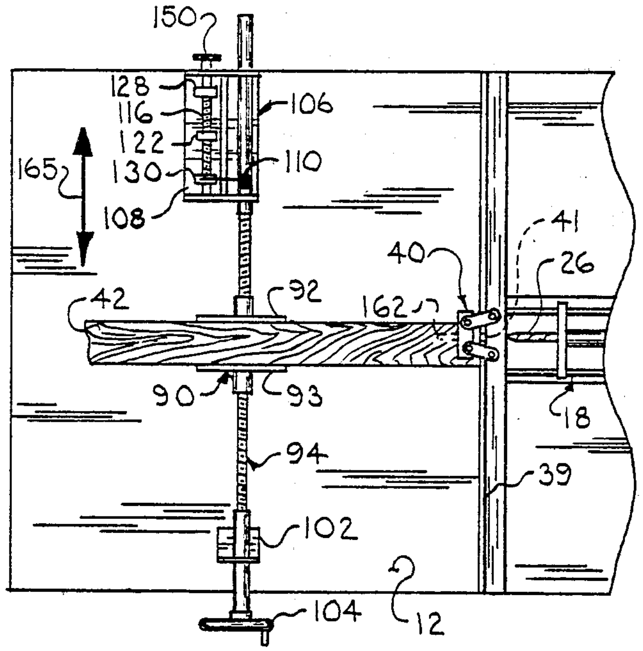
FIGS. 7 through 10 are fragmentary top plan views of the apparatus of FIGS. 1 through 6 illustrating the method of drilling aligned dowel holes in companion workpieces using the apparatus of the present invention.

FIGS. 7–10 illustrate the preferred steps for drilling dowel holes in companion workpieces using the apparatus of the present invention. With blade portion 112 in recess 127, the first workpiece 42 is placed between the clamping plates 92, 93 of the centering mechanism 90 and against the positioning bar 39. The stop members 128, 130 are placed in predetermined positions along the stop-support rod 116 to define the distance between the dowel holes. Initially, the stop engaging member 110 is moved in direction of lower arrow 165 to engage the stop 130 simultaneously positioning the centering mechanism 90 and the first work piece 42 in the first dowel hole drilling position as indicated in FIG. 7. When the workpiece 42 is in the first dowel hole drilling position, the top clamp assembly 40 is actuated to hold down the workpiece 42. The drilling mechanism 18 is then actuated to drill a first dowel hole 162.

Figure 8:
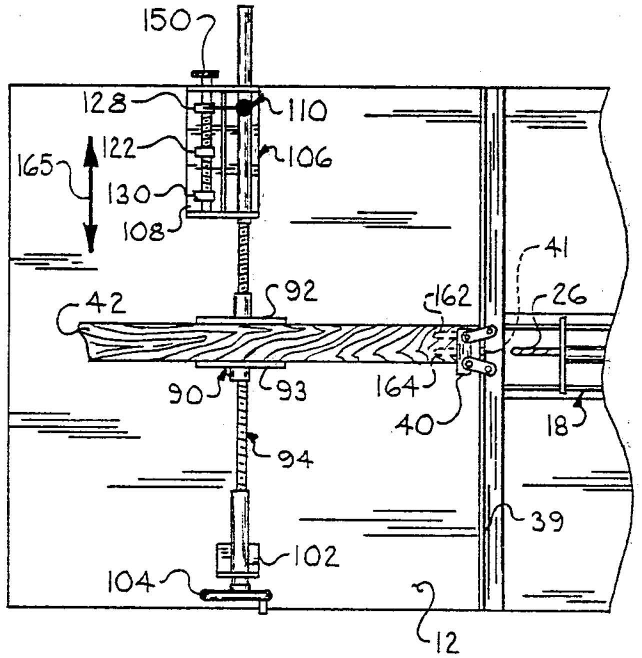

The top clamp 40 is then released and the stop engaging member 110 is moved in the direction of the upper arrow 165 to engage the stop 128, as illustrated in FIG. 8. The workpiece 42 is thus simultaneously positioned for drilling the second dowel hole. Again, the clamp 40 is actuated to hold the workpiece down against the table top 12 and the drilling mechanism actuated to drill a second dowel hole 164.

Figure 9:
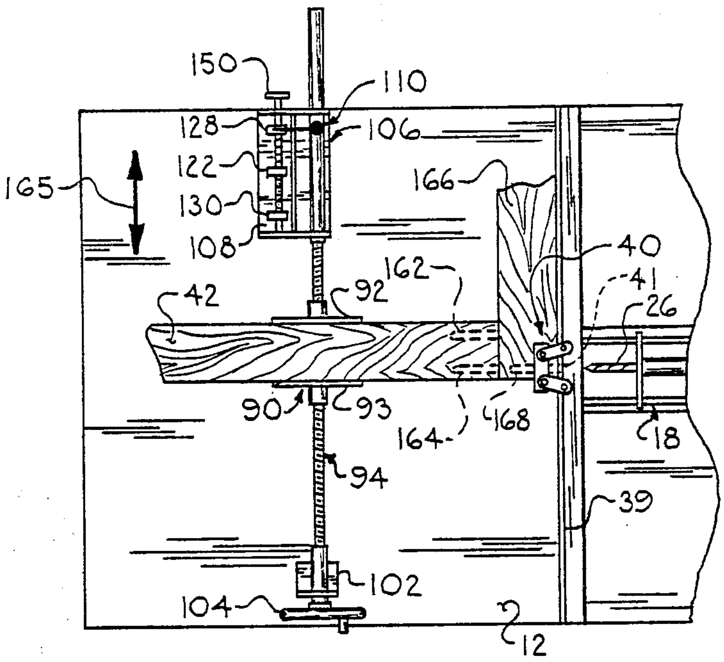
Figure 10:
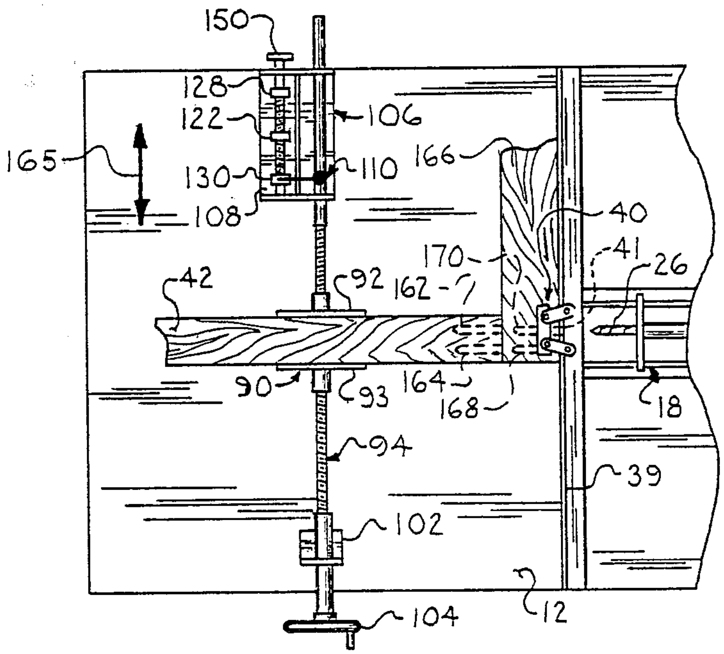

After the dowel holes 162, 164 are drilled into the ends of the first workpiece, matching dowel holes are drilled into a companion workpiece 166, as illustrated in FIGS. 9 and 10. The workpiece 42 is released from the clamping plates 92, 93 and moved away from positioning bar 39 while the companion workpiece 166 is inserted between the first workpiece 42 and the bar 39. One end of the companion workpiece 166 is aligned with an edge of the first workpiece 42, clamping plates 92, 93 are again engaged with this work piece 42, and the top clamp 40 is actuated to hold the companion workpiece 166 in place, all as seen in FIG. 9. The drilling mechanism 18 is then actuated to drill a third dowel hole 168. As illustrated in FIG. 9, the third dowel hole 168 is automatically aligned with the second dowel hole 164.

The top clamp 40 is then placed into an open position, releasing the companion workpiece 166, and the stop engaging member 110 is moved in direction of lower arrow 165 to engage the stop 128. In moving the stop engaging member 110 to engage the stop 128, the first workpiece 42 is simultaneously aligned with the previous position where the first dowel hole 162 was drilled. The end of the companion workpiece 166 is once again aligned with the edge of the first workpiece 42, as previously described. The top clamp 40 is then actuated into the clamping position and a fourth dowel hole 170 is drilled into the companion workpiece 166.

Aligned dowel holes can also be drilled in the companion workpiece at an intermediate position. The dowel holes in the first workpiece are drilled in the manner described above. The dowel holes in the companion workpiece are also drilled in a similar manner except that a reference line drawn on the companion workpiece is aligned with the edge of the first workpiece.

Figure 11:
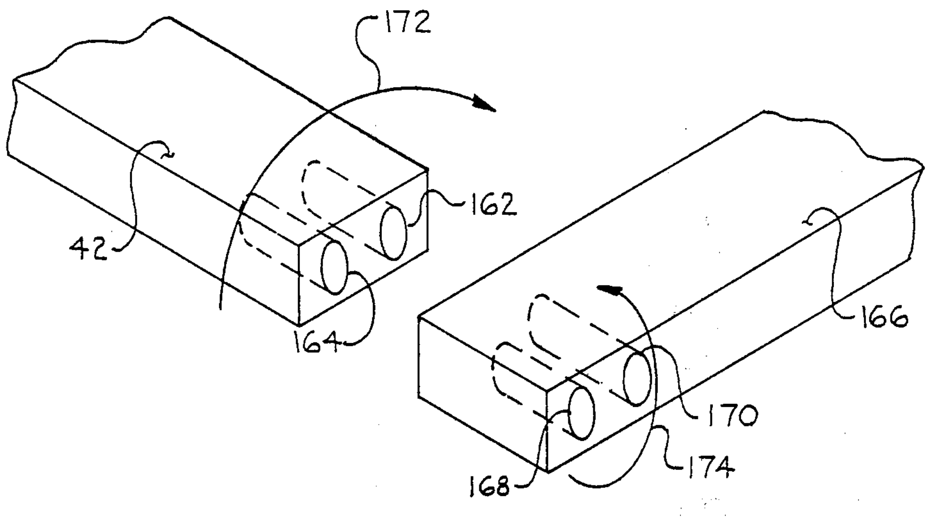
FIGS. 11 and 12 are perspective views illustrating the manner of mating two companion work pieces having dowel holes drilled by the apparatus of the present invention.
Figure 12:
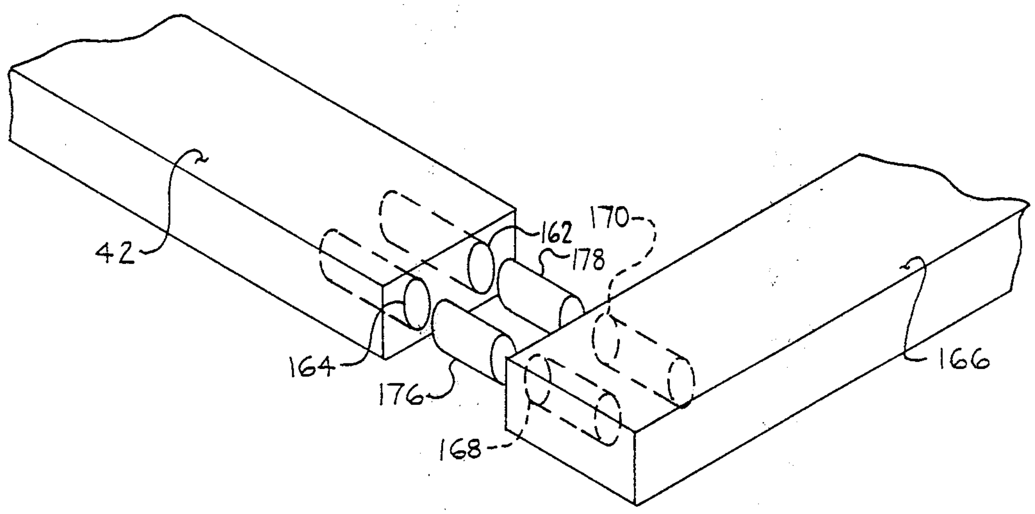

As seen in FIGS. 11 and 12, to align the first workpiece 42 and the companion workpiece 166 so that the dowel holes match, the first workpiece 42 is flipped over in the direction of arrow 172, such that the bottom surface is now the top surface and the companion workpiece 166 is flipped over in the direction of arrow 174, such that its bottom surface is now on top, as illustrated in FIG. 11. The dowel hole 164 is then aligned with the dowel hole 168 and the dowel hole 162 will be precisely in alignment with the dowel hole 170, as illustrated in FIG. 12. In this manner, thickness differences between the first workpiece and the companion workpiece do not affect alignment of the dowel holes. Dowels 176, 178 may then be inserted into the dowel holes 164, 168 and dowel holes 162, and 170, respectively, and if desired an appropriate adhesive can be applied to join the two workpieces together.

Figure 14:
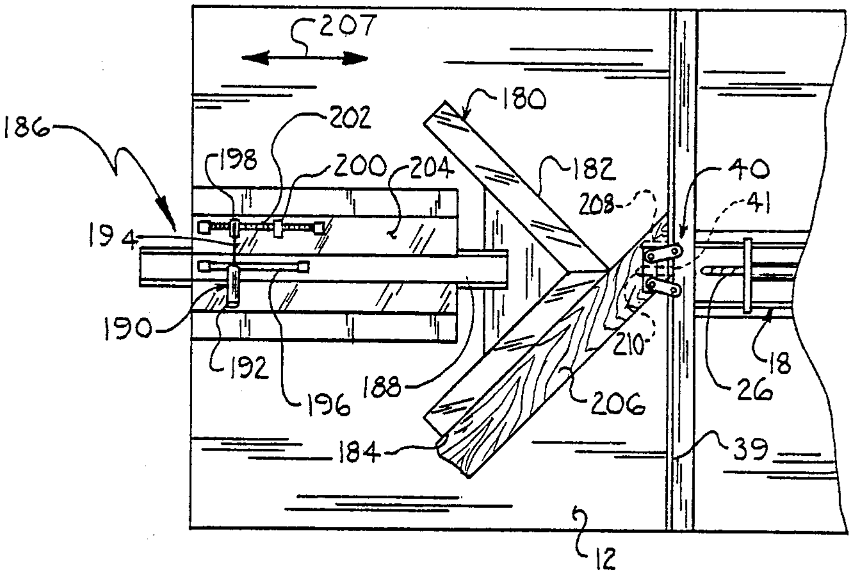
FIGS. 13 and 14 are fragmentary top plan views illustrating an alternative embodiment of the present invention useful for drilling dowel holes into companion workpieces having mitered ends.
Figure 13:
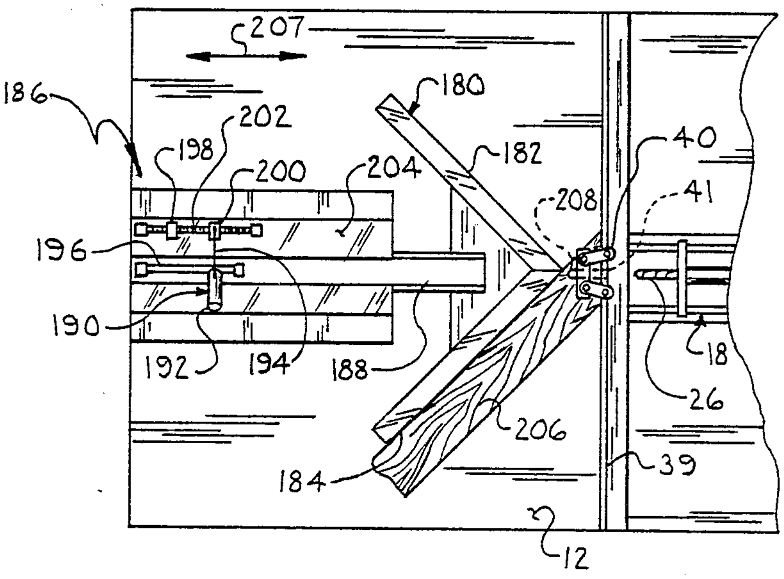

An alternative embodiment of the apparatus of the present invention is designed to drill dowel holes in mitered workpieces, as illustrated in FIGS. 13 and 14. Some of the apparatus including the apparatus to the right of top assembly clamp 40 and vertical positioning bar 39 in the embodiment of FIGS. 13 and 14 is identical with the corresponding apparatus in FIGS. 1 through 12 and such parts are identically numbered. A centering mechanism or square 180, is provided with centering surfaces 182 and 184, perpendicular to each other and converging on the drilling axis defined by drill bit 26. The surfaces 182 and 184 form approximately 45° angles with a vertical plane including the drilling axis.

The centering square 180 is fixedly attached to a positioning mechanism 186 by a slide bar 188. The positioning mechanism 186 is similar to the positioning mechanism 106. A stop engaging member 190 having a handle 192 and a knife 194 is pivotally attached to a horizontal rod 196. The rod 196 is in turn fixedly attached to the slide bar 188. A pair of stop members 198 and 200 are positioned on a threaded shaft 202. The stop members 198 and 200 are moved along the shaft 202 and define the dowel hole positions in a similar manner as described previously. The shaft 202 is retained in a fixed substantially parallel position with respect to the drilling axis preferably secured with respect to a stationary base plate 204 that is in turn fixedly attached to the table top 12.

The positioning mechanism 186 moves the centering mechanism 180 parallel to the drilling axis through the instrumentality of slide bar 188 in directions as indicated by arrows 207. When the stop engaging member 190 engages the first stop 200, the centering mechanism is in position for drilling a first dowel hole 208 as illustrated in FIG. 13. A first workpiece 206 having a mitered end is automatically centered by being placed against the centering surface 184 so that the mitered end engages the positioning bar 39. The top clamp 40 is then actuated into the clamping position holding the workpiece 206 firmly against the table top 12. The dowel hole 208 is then drilled with the drilling mechanism 18. The first workpiece is then released from the top clamp 40.

To drill a second dowel hole 210 in the workpiece 206, the stop engaging member 190 is moved to engage stop member 198 thereby moving the slide bar 188 and the centering mechanism 180 in direction away from the bar 39. The first workpiece 206 is slid along the surface 184 such that the mitered end of the workpiece once again engages the bar 39. This is illustrated in FIG. 14. The workpiece is now automatically in position for drilling the second dowel hole 210. The clamp 40 actuated to hold the workpiece 206 against the table top 12; and the drill mechanism 18 is actuated to drill the dowel hole 210.

Similarly, a companion workpiece also having a mitered end (not shown) is positioned along the centering surface 182 and through the steps described above, dowel holes are drilled in its mitered end. It will be appreciated by those skilled in the art that the dowel holes drilled in the mitered ends will align perfectly when the workpieces are joined together with dowels.

Preferably, the centering mechanism 90 and the positioning mechanism 106 as shown in FIGS. 1 through 12 can be removed from the table top 12 and the centering mechanism 180 and the positioning mechanism 186 of FIGS. 13 and 14 attached to the table top 12 in their place. The table top 12 includes a plurality of threaded apertures (not shown) which when receiving cooperating screws (not shown) detachably secure the desired centering and positioning mechanisms to the table top 12 and position them properly and accurately with respect to the drilling axis.

CONCLUSION

The apparatus of the present invention can be used to drill matching dowel holes in companion workpieces in a quick and efficient manner. The workpiece is placed in a centering mechanism which has been pre-aligned with the drilling axis of a drilling mechanism. The centering mechanism is quickly positioned to dowel hole drilling positions by a positioning mechanism which defines at least two predetermined dowel hole positions.

Although the present invention has been described with reference to the preferred embodiments, workers skilled in the art will recognize that changes may be made in form and detail without departing from the spirit and scope of the invention.

What is claimed is:

1. An apparatus for drilling matching dowel holes in a workpiece, the apparatus comprising:

a frame having a top with an upper surface;

a workpiece positioning bar extending upwardly from said frame top surface;

drilling means for drilling dowel holes, said drilling means being slidably attached to the upper frame top surface and movable along a drilling axis at right angles to said first positioning bar;

centering means for centering a workpiece with respect to the drilling axis, said centering means being movable along a positioning axis;

positioning means for positioning the workpiece through positioning the centering means in at least two dowel hole drilling positions, the positioning means including first and second stop members defining first and second dowel hole drilling positions and a stop engaging member positionable alternatively to engage the first and second stop members and movable therebetween in a direction parallel to the positioning axis; and a connecting member having opposite ends being connected at one end to the centering means and connected at the other end to the stop engaging member of the positioning means such that when the stop engaging member is moved to engage the first stop member, the centering means is moved to the first dowel hole position and when the stop engaging member is moved to engage the second stop member, the centering means is moved to the second dowel hole position thereby selectively positioning the workpiece, when in contact with said first positioning bar, in the first and second dowel hole drilling positions.

2. The apparatus of claim 1 wherein the centering means includes a threaded centering rod having left-hand and right-hand threaded portions converging on a point lying in a vertical plane including the drilling axis, means for rotating said centering rod, and first and second clamping plates threadably engaging the left-hand and right-hand threaded portions, respectively, such that the first and second clamping plates move to a clamping position upon rotation of said rod, clamping and centering the workpiece placed between the clamping plates.

3. The apparatus of claim 2 wherein the positioning means further includes a stop-support rod having left-hand and right-hand threads, and wherein the first and second stop members threadably engage the left-hand and right-hand threads, respectively, and means for rotating the stop-support rod such that the first and second stop members are positionable with respect to each other upon rotation of the stop-support rod.

4. The apparatus of claim 3 wherein the left-hand and right-hand threads of the stop-support rods converge upon a spool-like ring, the spool-like ring being positioned such that when the stop-engaging member engages the spool-like ring the point of convergence of the left-hand and right-hand threads of the threaded centering rod of the centering means is lying in the vertical plane of the drilling axis.

5. The apparatus of claim 2 wherein the connecting member is an extended portion of the centering rod, and the centering rod is rotatably mounted with respect to the stop engaging member and the stop engaging member is fixed to move longitudinally with the centering rod.

6. The apparatus of claim 5 wherein the positioning axis is substantially perpendicular to the drilling axis.

7. The apparatus of claim 1 and further comprising a top clamping mechanism for clamping a workpiece against the upper surface of the frame top in operational alignment with the drilling axis.

8. The apparatus of claim 1 wherein the positioning axis is substantially parallel to the drilling axis and wherein the centering means includes a centering square having first and second positioning surfaces substantially perpendicular to each other and converging at a point lying in a vertical plane which includes the drilling axis.

9. The apparatus of claim 8 wherein the first and second positioning surfaces form approximately a 45° angle with the drilling axis.

10. The apparatus of claim 1 and further including a motor means for driving the drilling means.

11. A method of drilling matching dowel holes in companion workpieces using the apparatus of claim 1, including the steps of:
positioning a first workpiece in the centering means and against the workpiece positioning bar;
moving the stop engaging member to engage the first stop member of the positioning means;
drilling a first dowel hole in the first workpiece;
moving the stop engaging member to engage the second stop member of the positioning means;
drilling a second dowel hole in the first workpiece;
repositioning the first workpiece within the centering means away from the workpiece positioning bar;
positioning a second companion workpiece between the first workpiece and the workpiece positioning bar and against the workpiece positioning bar;
aligning the second workpiece with the first workpiece with respect to a reference point common between the first and second workpieces;
drilling a third dowel hole in the second companion workpiece;
moving the stop engaging member to engage the first stop member of the positioning means;
realigning the second workpiece with the first workpiece with regard to the common reference point;
drilling a fourth dowel hole in the second companion workpiece;
removing the first and second workpieces from the apparatus; and
mating the first and second workpieces by inserting a first dowel in the first and fourth dowel hole and a second dowel in the second and third dowel hole and bringing the first and second workpieces into abutting engagement.

12. The method of claim 11 and further including the step of:
clamping the first workpiece against the upper surface of the top when the first workpiece is positioned against the workpiece positioning bar for drilling the first and second dowel holes and alternatively clamping the second companion workpiece when the second companion workpiece is positioned against the workpiece positioning bar while the third and fourth dowel holes are being drilled.

* * * * *